Dec. 31, 1929.   F. A. WRIGHT   1,742,116
MEANS FOR ENABLING LIGHT TO PENETRATE FOGGY ATMOSPHERE
Filed Feb. 23, 1929
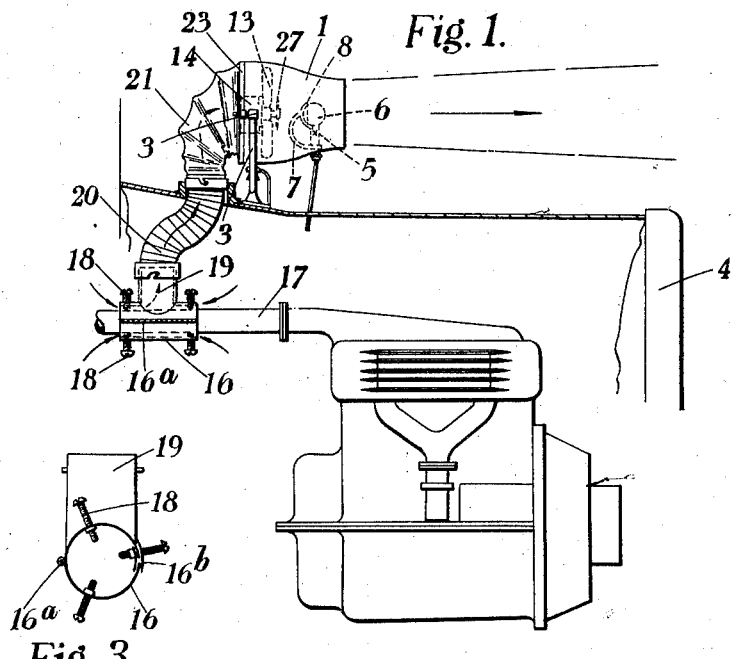
Fig. 1.
Fig. 3.
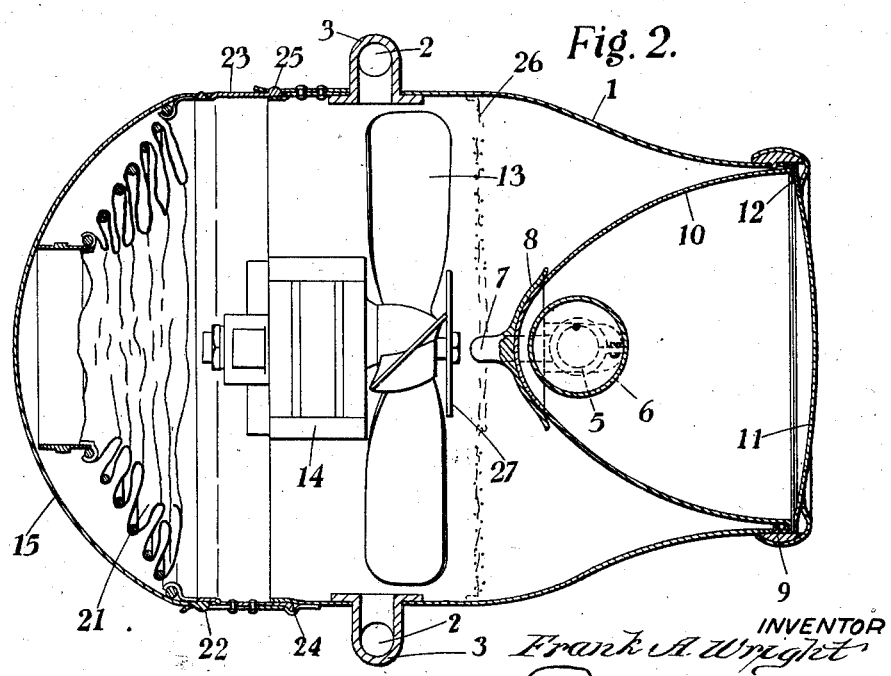
Fig. 2.
INVENTOR
Frank A. Wright
By James L. Norris.
ATTORNEY Patented Dec. 31, 1929

1,742,116

UNITED STATES PATENT OFFICE

FRANK ARCHIBALD WRIGHT, OF WESTCLIFF-ON-SEA, ENGLAND

MEANS FOR ENABLING LIGHT TO PENETRATE FOGGY ATMOSPHERE

Application filed February 23, 1929, Serial No. 342,176, and in Great Britain December 10, 1927.

This invention relates to improvements in means of the kind provided to increase the distance to which light from a lamp would otherwise penetrate foggy atmosphere wherein a current of air supplied from a compressing machine has been directed along the beam of light from the lamp.

According to my invention the improved means comprises a tubular casing having a lamp arranged therein and a fan or blower also arranged therein rearwardly of the said lamp, to project a current of air at a high velocity substantially in the direction of the beam of light from the said lamp, either in such beam or around or adjacent to the same. It has been found in practice that by this means the density of the particles of water or other material in foggy or misty air can be very materially reduced so that the beam of light from the lamp will illuminate the roadway or course for a longer distance in front of the vehicle or boat and thus enable the driver to proceed in greater safety.

According to one method of carrying the invention into practice, a tubular casing is provided having the lamp arranged in the axis thereof, and the fan or blower arranged therein rearwardly of the lamp is actuated by suitable means such as an electric motor situated within the casing. The said casing can be mounted in the same manner as the ordinary head lights or side lights of a vehicle either beside the bonnet or carried forward on the front dumb iron, wing or mudguard. In some instances it can be carried on the windscreen or on the hood, and may have a decreasing cross-sectional area in the direction in which air is propelled therethrough.

In the accompanying drawing,

Figure 1 is a side elevation showing apparatus constructed according to this invention, mounted upon an automobile vehicle.

Figure 2 is a horizontal sectional view of parts shown in Figure 1 drawn to a larger scale.

Figure 3 is a detail view hereinafter referred to.

As shown in the drawing a tubular casing 1 is provided with eyes 2 adapted to be engaged on the arms of a supporting bracket 3 mounted, for example, upon the bonnet 4 of an automobile vehicle, or in any other convenient situation for use. Within this tubular casing a lamp holder 5 is provided in which a lamp 6 can be held. The lamp holder is provided with a bracket 7 supporting a reflector 8 behind the lamp so as to reflect light from the latter forwardly through the forward end of the casing, or the said reflector 8 may be supported directly upon the lamp holder 5. The tubular casing 1, as shown in Figure 2, is provided with a lens ring 9 removably held thereon by means of any suitable means of attachment. An extension 10 of the reflector 8 can be provided supported between the reflector 8 and the inner face of a lens or like glass 11 held within the lens ring 9, suitable elastic or other packing 12 being provided, if necessary, to hold the reflector extension firmly seated without rattling when subjected to vibration. This arrangement allows the reflector extension 10 and lens or glass 11 to be removed to allow a free passage out from the open forward end of the casing 1.

Within the casing, rearwardly of the lamp 6, a fan or blower 13 is mounted, actuated by suitable means, such as an electric motor 14.

The tubular casing is open at its rear end and is provided with a door 15 which can be opened to allow a supply of air to be drawn in by the fan or blower. In order to heat the air supplied to this fan or blower, a sleeve 16 may be arranged around a manifold or pipe 17 conveying exhaust gases from the engine, as shown in Figures 1 and 3, the sleeve being supported by means of screws 18 so as to provide an annular passage for air to be supplied to the fan or blower. To permit the sleeve 16 to be readily attached to or removed from the manifold or pipe 17, the said sleeve is formed in two parts connected by a hinge 16$^a$ and secured in tubular form by a latch device 16$^b$. The air warmed by flowing over the exhaust pipe 17 is led through a branch 19 to a flexible pipe or conduit 20, allowing an equipment of a stock pattern to be adapted for mounting in different situations. For the same reason, this flexible pipe or conduit 20 is connected to the tubular casing by means of a collapsible or concertina-like structure 21 which can be secured at one end thereof to the said flexible pipe or conduit by a bayonet-joint or like attachment means allowing the parts to be readily separated and reconnected.

When the apparatus is not in use for projecting a current of air along the beam of light issuing from the front of the tubular casing, the concertina-like structure is collapsed and stowed within the door 15 held in its closed position by a latch 22. The rear end of the tubular casing then presents a neat appearance.

When the apparatus is to be put to use, the door 15 is opened and the collapsible or concertina-like structure drawn out and coupled to the flexible pipe or conduit 20, the forward end of the casing is opened by the removal of the lens 11 and reflector extension 10, and the fan or blower is set in operation to propel a current of air in the direction of the beam of light issuing from the lamp which is protected from the draught and particles carried along in the air current by the reflector 8.

The collapsible or concertina-like structure at its forward end may be conveniently fitted to a ring 23 forming part of the tubular casing and hinged thereto at 24 this ring being moreover provided with a latch device 25 for holding it against movement about the said hinge connection, this method of mounting the said structure permitting access to be had to the motor and fan, by turning the said ring about its hinge support 25, for purpose of adjustment, renewal or repair.

In order that the current of air passing through the tubular casing may be caused to move at a substantially uniform velocity at all parts of a given cross sectional plane, one or more wire gauze, perforated sheet metal or like screens 26 can be inserted transversely to the direction of flow of the air, in convenient positions within the said casing. To assist in attaining this result, the fan may be provided with a central screen or shroud 27, and the vanes may be designed to impart a rate of flow which is approximately equal at different radial distances from the centre of the fan.

When the arrangements in accordance with this invention are adapted to lamps carried by boats, ships or to other signal lights such as railway signals, other convenient means than those hereinabove mentioned may be employed for the purpose of actuating the fan or blower, or for heating the air previous to its propulsion out of the casing.

I claim:

1. An apparatus of the character described, comprising a tubular horizontal casing open at its rear and forward ends, lighting means in said casing adjacent the forward end of the latter, means in said casing behind said lighting means for drawing air through the rear end of said casing and forcing it at high velocity past said lighting means through the forward end of the casing, and a flexible conduit having its forward end connected to the rear end of the casing and provided at its rear end with means for detachable connection with a source of heated air, said conduit being foldable within the rear end of said casing.

2. An apparatus according to claim 1 including a reflector removably mounted in the casing between the lighting means and the air drawing and forcing means, and a cover for the rear end of the casing.

FRANK ARCHIBALD WRIGHT.